(12) United States Patent
Kerber et al.

(10) Patent No.: US 8,041,540 B2
(45) Date of Patent: Oct. 18, 2011

(54) SYSTEM, DEVICE, AND METHOD FOR ACOUSTIC AND VISUAL MONITORING OF A WIND TURBINE

(75) Inventors: Lutz Kerber, Berlin (DE); Florian Doorenspleet, Rheine (DE)

(73) Assignee: General Electric Company, Schenectady, NY (US)

( * ) Notice: Subject to any disclaimer, the term of this patent is extended or adjusted under 35 U.S.C. 154(b) by 54 days.

(21) Appl. No.: 12/634,435

(22) Filed: Dec. 9, 2009

(65) Prior Publication Data

US 2011/0135442 A1    Jun. 9, 2011

(51) Int. Cl.
G01D 21/02 (2006.01)
G01D 18/00 (2006.01)
G01D 21/00 (2006.01)
G01D 3/08 (2006.01)
G06F 19/00 (2006.01)
G06F 17/40 (2006.01)

(52) U.S. Cl. ........ 702/182; 73/570; 73/865.8; 73/865.9; 340/679; 340/683; 340/870.07; 340/870.09; 340/870.16; 416/61; 702/34; 702/56; 702/187; 702/189

(58) Field of Classification Search ............ 73/147, 73/432.1, 455, 457, 460, 570, 865.8, 865.9, 73/866.3, 66; 340/500, 540, 580, 665, 679, 340/682, 683, 870.01, 870.07, 870.09, 870.16; 367/13; 382/100, 107; 416/61; 702/1, 33, 702/34, 56, 127, 182, 183, 184, 185, 187, 702/188, 189

See application file for complete search history.

(56) References Cited

U.S. PATENT DOCUMENTS

| | | | | |
|---|---|---|---|---|
| 2,883,255 | A | * | 4/1959 | Anderson ................ 346/34 |
| 3,257,652 | A | * | 6/1966 | Foster .................... 340/521 |
| 3,321,613 | A | * | 5/1967 | Searle ..................... 702/182 |
| 3,641,530 | A | * | 2/1972 | Schoenwitz ............ 340/870.13 |
| 6,973,396 | B1 | | 12/2005 | Shah et al. |
| 7,080,398 | B1 | * | 7/2006 | Wichelman et al. ....... 725/107 |
| 7,295,950 | B2 | * | 11/2007 | Iyengar .................... 702/182 |
| 7,349,746 | B2 | * | 3/2008 | Emigholz et al. .......... 700/21 |
| 7,479,876 | B2 | * | 1/2009 | Carle et al. ............. 340/539.17 |
| 7,896,613 | B2 | * | 3/2011 | Xiong ........................ 416/1 |
| 2006/0058898 | A1 | * | 3/2006 | Emigholz et al. .......... 700/29 |
| 2006/0238332 | A1 | * | 10/2006 | Carle et al. ............. 340/539.1 |
| 2007/0005301 | A1 | * | 1/2007 | Iyengar .................... 702/185 |
| 2008/0164091 | A1 | * | 7/2008 | Kerber ..................... 181/211 |

(Continued)

FOREIGN PATENT DOCUMENTS

EP    1 944 667 A1 *    7/2008

(Continued)

OTHER PUBLICATIONS

Louis Fournier et al., Wind Turbine Blades Video-based Monitoring System, Feb. 2006, 1 page, EDF R&D, France.

(Continued)

*Primary Examiner* — Edward Cosimano
(74) *Attorney, Agent, or Firm* — James McGinness, Esq.; Armstrong Teasdale LLP

(57) ABSTRACT

A method for monitoring a wind turbine. A monitoring signal, including an audio signal and/or an image signal, is received from a monitoring device. Operating data are calculated based on the received monitoring signal. An operating condition and/or a deviation is determined by comparing the operating data to baseline data.

20 Claims, 11 Drawing Sheets

U.S. PATENT DOCUMENTS

| | | | |
|---|---|---|---|
| 2008/0243434 A1* | 10/2008 | Boutin | 702/179 |
| 2010/0133819 A1* | 6/2010 | Kinzie et al. | 290/44 |
| 2010/0143117 A1* | 6/2010 | Xiong | 416/1 |
| 2011/0084485 A1* | 4/2011 | Miranda et al. | 290/44 |
| 2011/0103933 A1* | 5/2011 | Olesen et al. | 415/118 |

FOREIGN PATENT DOCUMENTS

| | | | |
|---|---|---|---|
| WO | 2008043874 A1 | 4/2008 | |

OTHER PUBLICATIONS

Goran Ronsten, "Visualization of the Elastic Blade Motion of an Operating Wind Turbine," Apr. 2005, 45 pages, ISSN 1650-1942, FOI Swedish Defence Research Agency, Division of Aeronautics, FFA, Stockholm, Sweden.

* cited by examiner

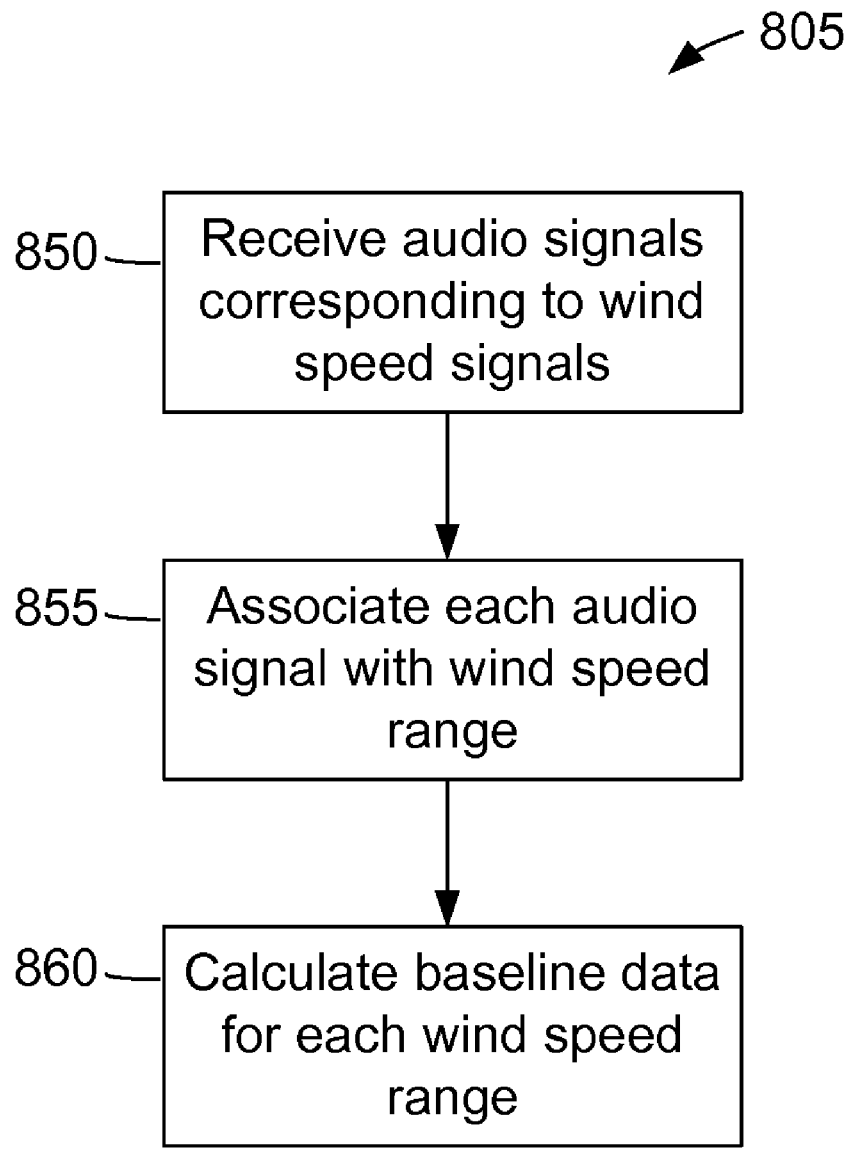

SYSTEM, DEVICE, AND METHOD FOR ACOUSTIC AND VISUAL MONITORING OF A WIND TURBINE

BACKGROUND OF THE INVENTION

The subject matter described herein relates generally to monitoring a wind turbine and, more particularly, to automated monitoring of a wind turbine using acoustic and/or visual data.

A wind farm includes one or more wind turbines which utilize wind energy to generate or produce electrical power. Wind turbines are generally subjected to operational detriments from environmental elements, such as wind shear, extreme temperatures, icing, and oceanic waves, other external elements, internal friction, and general mechanical wear. Operational detriments may eventually cause suboptimal performance, whether temporarily (e.g., rotor blade icing) or indefinitely (e.g., structural damage to a rotor blade).

At least some known methods of monitoring wind turbines detect operational detriments indirectly by detecting symptoms, such as decreased power output and/or inoperability, of a wind turbine. Moreover, because many potential causes exist for such symptoms, determining the root cause of a symptom requires manual inspection by a service technician, introducing undesirable delay and expense before the root cause can be addressed.

BRIEF DESCRIPTION OF THE INVENTION

In one aspect, a system for monitoring a wind turbine is provided. The system includes a monitoring device coupled to a wind turbine and configured to provide one or more monitoring signals. The monitoring signals include an audio signal and/or an image signal. For example, an audio signal may include digitally sampled audio from a microphone and an image signal may include one or more still images and/or one or more video streams.

The system also includes a monitoring controller communicatively coupled to the monitoring device. The monitoring controller is configured to provide baseline data representative of normal operation of the wind turbine and to create operating data based on a monitoring signal received from the monitoring device. The monitoring controller is further configured to compare the operating data to the baseline data to determine a deviation and, when the deviation exceeds a threshold, transmit a deviation notification.

In another aspect, a device for monitoring an operating condition of a wind turbine is provided. The device includes a monitoring device interface configured to receive one or more monitoring signals from a wind turbine monitoring device. The monitoring signal includes an audio signal and/or an image signal. The device also includes a memory area configured to store baseline data calculated from at least a first monitoring signal received by the monitoring device interface at a first time and a processor coupled to the monitoring device interface and the memory area. The processor is programmed to calculate operating data based on a second monitoring signal received by the monitoring device interface at a second time and to compare the operating data to the baseline data to determine an operating condition of the wind turbine. The device further includes a communication interface configured to transmit the operating condition of the wind turbine to a remote device.

In yet another aspect, a method is provided for monitoring a wind turbine having a monitoring device configured to provide one or more monitoring signals. The monitoring signals include an audio signal and/or an image signal. The method includes calculating, by a computing device, baseline data based on at least one first monitoring signal. A second monitoring signal is received from the monitoring device. Operating data are calculated by the computing device based on the second monitoring signal. An operating condition of the wind turbine is determined by comparing the operating data to the baseline data, and the operating condition is transmitted to a remote device.

BRIEF DESCRIPTION OF THE DRAWINGS

FIGS. 10 and 11 are a flowchart of an exemplary method for monitoring a wind turbine.

DETAILED DESCRIPTION OF THE INVENTION

The embodiments described herein facilitate monitoring an operating condition of a wind turbine based on one or more audio and/or image signals from a monitoring device. In one embodiment, baseline data are generated from a first signal or signals at a time when the wind turbine is operating in a normal state. These signals may be referred to as "test" signals. Operating data are generated from a second signal or signals at a later time and compared to the baseline data. A deviation between the baseline data and operating data may be determined.

An exemplary technical effect of the methods, system, and apparatus described herein includes at least one of: (a) calculating, by a computing device, baseline data based on one or more first monitoring signals; (b) receiving, from the monitoring device, a second monitoring signal; (c) calculating, by the computing device, operating data based on the second monitoring signal; (d) determining an operating condition of the wind turbine by comparing the operating data to the baseline data; and, (e) transmitting the operating condition to a remote device.

Figure 1:
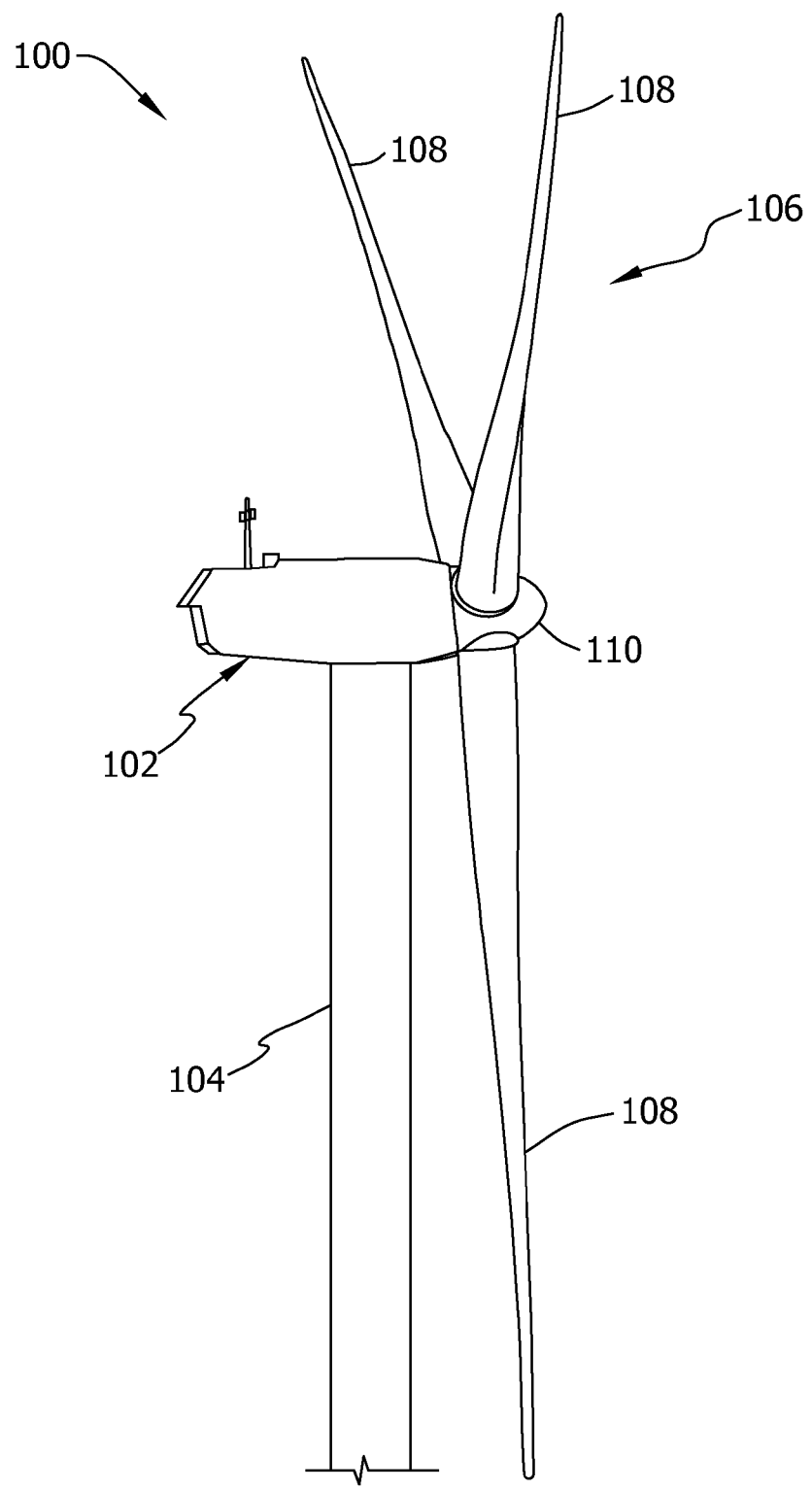
FIG. 1 is a perspective view of an exemplary wind turbine.

FIG. 1 is a perspective view of an exemplary wind turbine 100. Wind turbine 100 includes a nacelle 102 that houses a generator (not shown in FIG. 1). Nacelle 102 is mounted on a tower 104 (only a portion of tower 104 is shown in FIG. 1). Tower 104 may have any suitable height that facilitates operation of wind turbine 100 as described herein. In the exemplary embodiment, wind turbine 100 also includes a rotor 106 that includes three rotor blades 108 coupled to a rotating hub 110. Alternatively, wind turbine 100 may include any number of rotor blades 108 that enable operation of wind turbine 100 as described herein. In the exemplary embodiment, wind turbine 100 includes a gearbox (not shown) that is rotatingly coupled to rotor 106 and to the generator.

Figure 2:
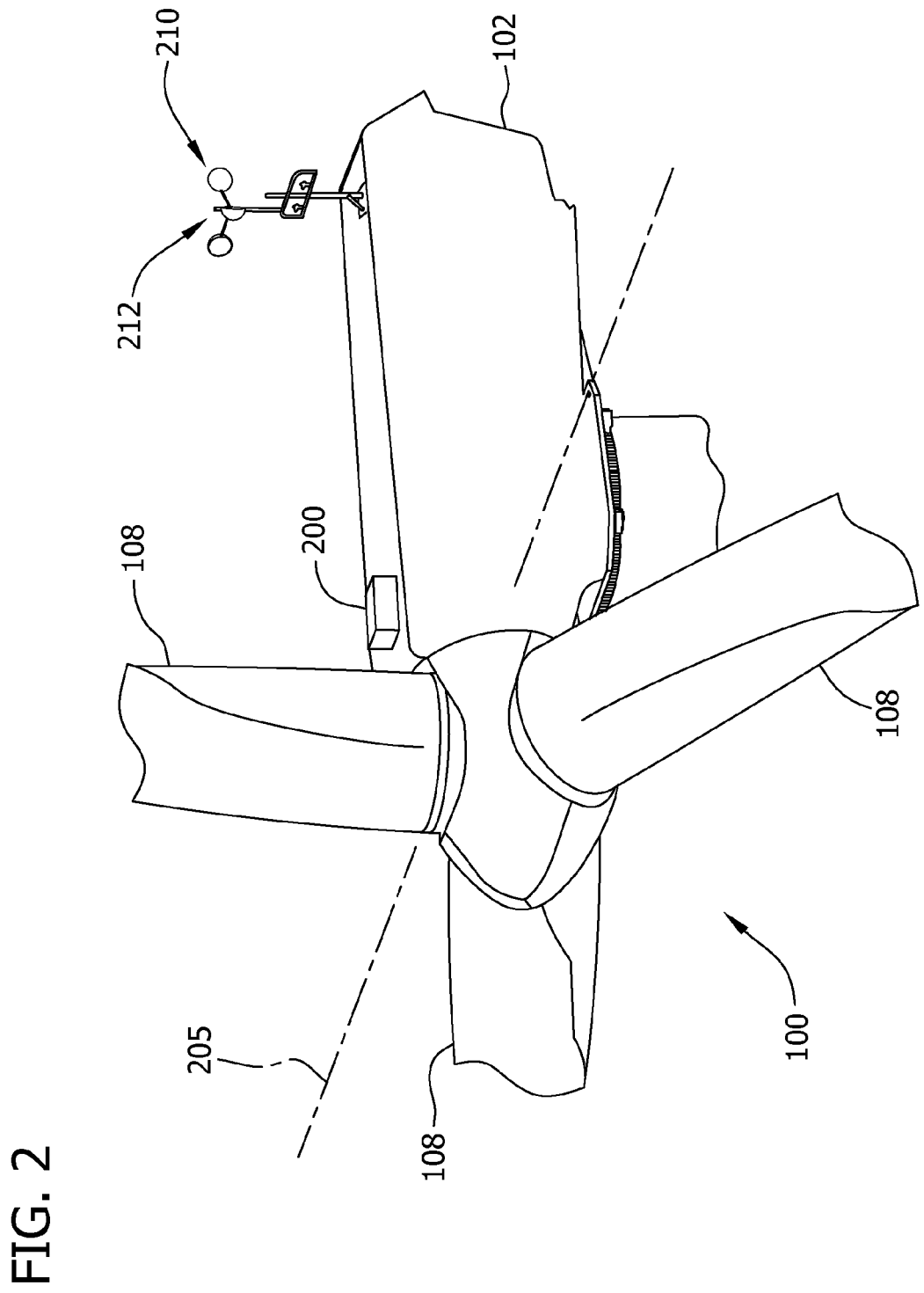
FIG. 2 is a perspective view of an exemplary monitoring device fixably coupled to the wind turbine shown in FIG. 1.

FIG. 2 is a perspective view of an exemplary monitoring device 200 fixably coupled to wind turbine 100. Monitoring device 200 is configured to provide a monitoring signal including an audio signal and/or an image signal. Monitoring device 200 includes, for example, a microphone, a still image camera, a video camera, and/or a webcam. In an exemplary embodiment, monitoring device 200 is positioned on top of nacelle 102. However, monitoring device 200 may be positioned at any location on wind turbine 100 allowing operation as described herein.

In some embodiments, monitoring device 200 provides an image signal. For example, monitoring device 200 may produce a still image (e.g., upon request), a series of still images, and/or a continuous video stream.

Monitoring device 200 may be directional or omnidirectional. For example, a directional microphone has a polar pattern making the microphone more sensitive to sound waves arriving from one direction than to sound waves arriving from another direction, whereas an omnidirectional microphone is substantially equally sensitive to sound waves arriving from all directions. Similarly, a camera may be configured to capture an image in only the direction that the lens is directed.

In some embodiments, monitoring device 200 is configured to monitor one or more rotor blades 108. In an exemplary embodiment, monitoring device 200 is a directional monitoring device 200 and is oriented parallel to a lateral axis 205 of nacelle 102. A rotor blade 108 may be monitored by directional monitoring device 200, for example, as the rotor blade 108 is approximately parallel to lateral axis 205. Furthermore, a rotor blade 108 may be stopped in a predetermined position each time monitoring device 200 transmits a monitoring signal for rotor blade 108 to facilitate comparing monitoring signals transmitted at different times.

In some embodiments, wind turbine 100 includes one or more sensors 210. Sensors 210 sense or detect wind turbine operating parameters. For example, sensor(s) 210 may include a wind speed and/or a direction sensor (e.g., an anemometer), an ambient air temperature sensor, an air density sensor, an atmospheric pressure sensor, a humidity sensor, a power output sensor, a blade pitch sensor, a turbine speed sensor, a gear ratio sensor, and/or any sensor suitable for use with wind turbine 100. Each sensor 210 is located according to its function. For example, FIG. 2 shows an anemometer 212 positioned on an outside surface of nacelle 102, such that anemometer 212 is exposed to air surrounding wind turbine 100. Each sensor 210 generates and transmits a signal corresponding to its function. For example, anemometer 212 transmits a signal indicating a wind speed and/or a wind direction.

Figure 3:
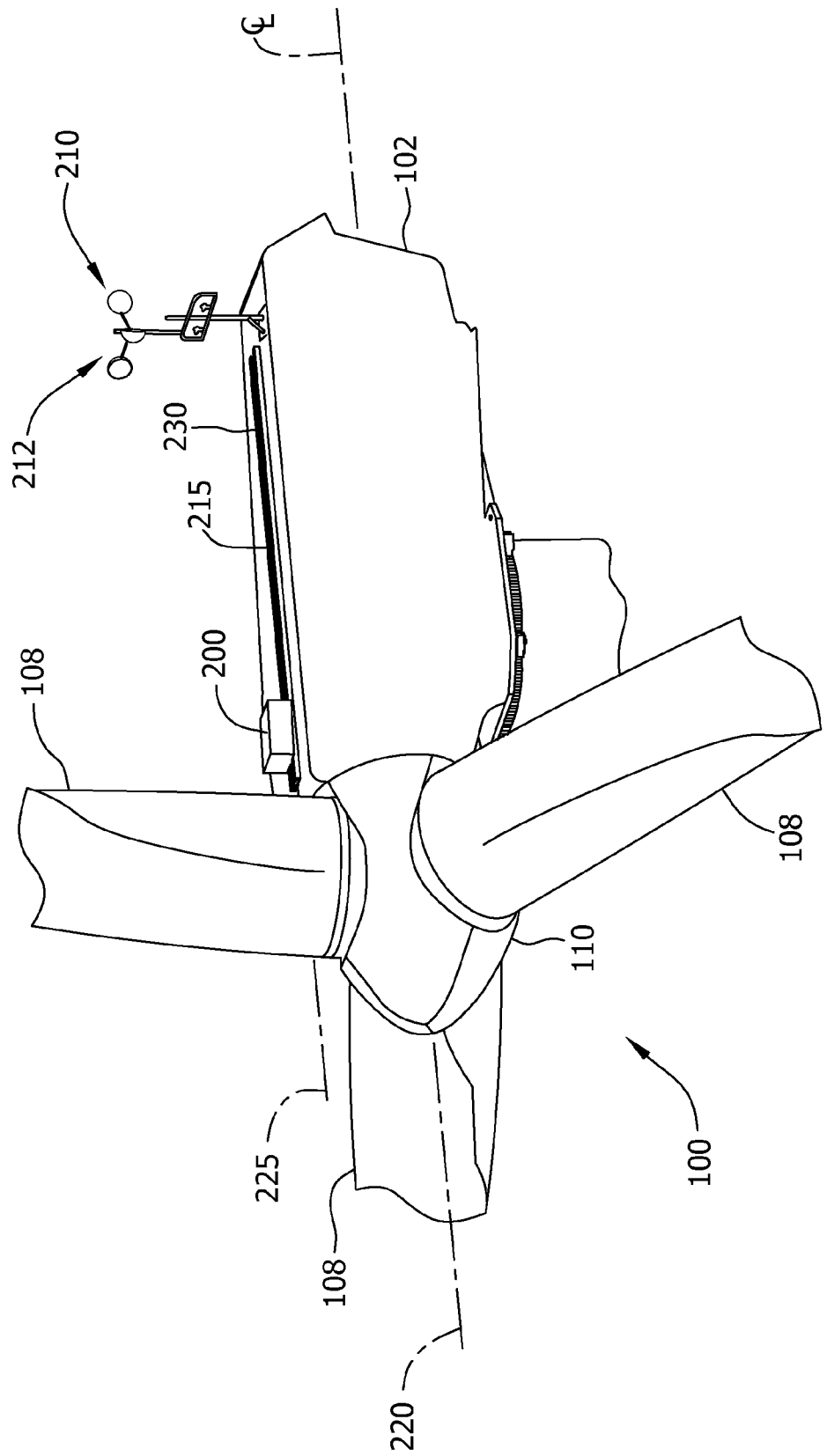
FIG. 3 is a perspective view of an exemplary monitoring device movably coupled to the wind turbine shown in FIG. 1.

FIG. 3 is a perspective view of an exemplary monitoring device 200 movably coupled to wind turbine 100. In an exemplary embodiment, nacelle 102 includes a translation mechanism 215. Rotating hub 110 rotates about a rotational axis 220, and translation mechanism 215 defines a translation axis 225 substantially parallel to rotational axis 220. Translation mechanism 215 includes, without limitation, a track, a rail, a cable, one or more wheels, and/or a servomechanism. FIG. 3 shows translation mechanism 215 as a track 230. Monitoring device 200 is translatably coupled to track 230 such that monitoring device 200 is movable along translation axis 225. Monitoring device 200 may be translatably coupled to track 230 via one or more wheels, gears and teeth, clips, cables, and/or any other device suitable for moving monitoring device 200 relative to nacelle 102. In some embodiments, monitoring device 200 includes at least a portion of translation mechanism 215.

The exemplary embodiment facilitates monitoring a rotor blade 108 from multiple perspectives. For example, if monitoring device 200 includes a camera, a plurality of still, two-dimensional images of a rotor blade 108 may be provided. Each image in this embodiment corresponds to a predetermined position along translation axis 225. The two-dimensional images may be combined into a three-dimensional image of rotor blade 108.

Figure 4:
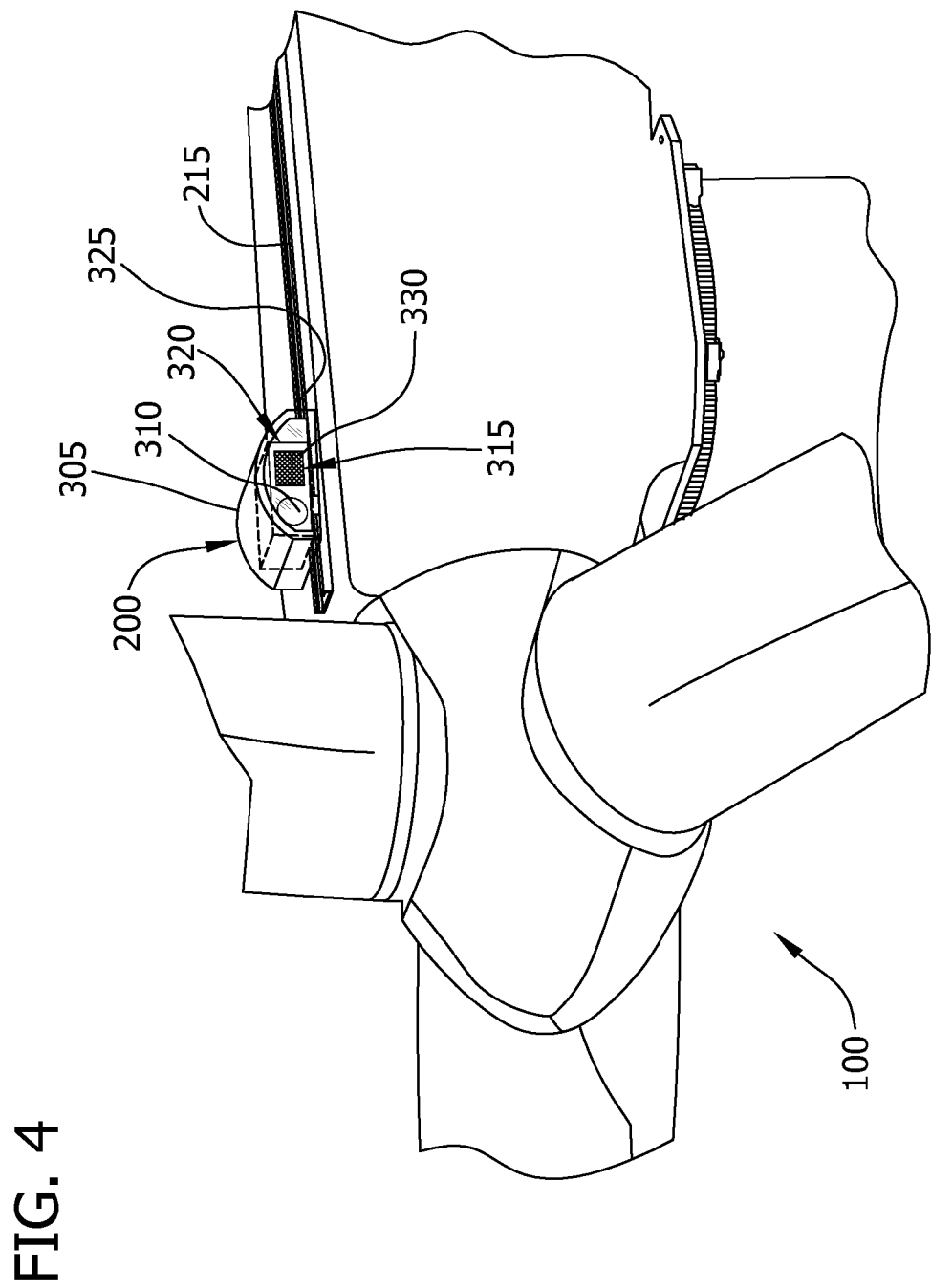
FIG. 4 is a perspective view of an exemplary monitoring device positioned within a protective housing.

FIG. 4 is a perspective view of an exemplary monitoring device 200 positioned within a protective housing 305. Monitoring device 200 includes a camera 310 and a microphone 315. Monitoring device 200 and housing 305 are translatably coupled to translation mechanism 215. Housing 305 includes an opening 320 through which monitoring device 200 monitors wind turbine 100.

Housing 305 is constructed of metal, plastic, fiberglass, and/or any other material suitable for shielding monitoring device 200 from external elements and conditions, such as wind, precipitation, icing, dirt, and/or birds. In some embodiments, housing 305 includes a protective panel 325 substantially covering opening 320. Protective panel 325 includes, for example, a fabric screen and/or a transparent window. Protective panel 325 facilitates further shielding monitoring device 200 from external elements and conditions.

Furthermore, microphone 315 may include a windscreen 330. Protective panel 325 and/or windscreen 330 facilitate minimizing wind noise in an audio signal provided by monitoring device 200.

Figure 5:
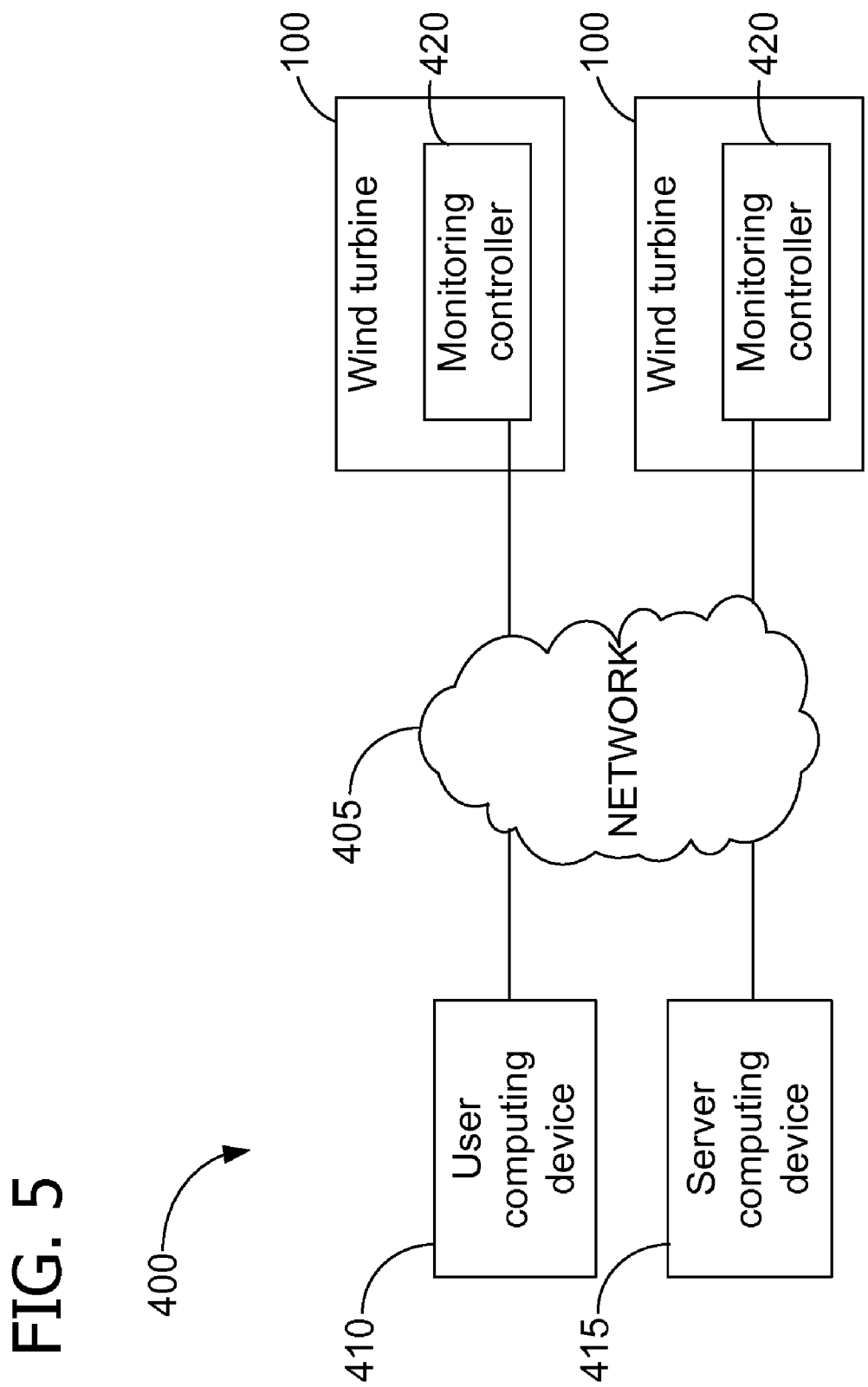
FIG. 5 is a block diagram illustrating an exemplary system for monitoring the wind turbine shown in FIG. 1.

FIG. 5 is a block diagram illustrating an exemplary system 400 for monitoring one or more wind turbines 100. System 400 includes a network 405. For example, network 405 may include, without limitation, the Internet, a local area network (LAN), a wide area network (WAN), a wireless LAN (WLAN), a mesh network, and/or a virtual private network (VPN).

A user computing device 410, a server computing device 415, and one or more wind turbine monitoring controllers 420 are configured to be communicatively coupled to each other via network 405. User computing device 410, server computing device 415, and wind turbine monitoring controller 420 communicate with each other and/or network 405 using a wired network connection (e.g., Ethernet or an optical fiber), a wireless communication means, such as radio frequency (RF), an Institute of Electrical and Electronics Engineers (IEEE) 802.11 standard (e.g., 802.11(g) or 802.11(n)), the Worldwide Interoperability for Microwave Access (WIMAX) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of Institute of Electrical and Electronics Engineers, Inc., of New York, N.Y.

Figure 6:
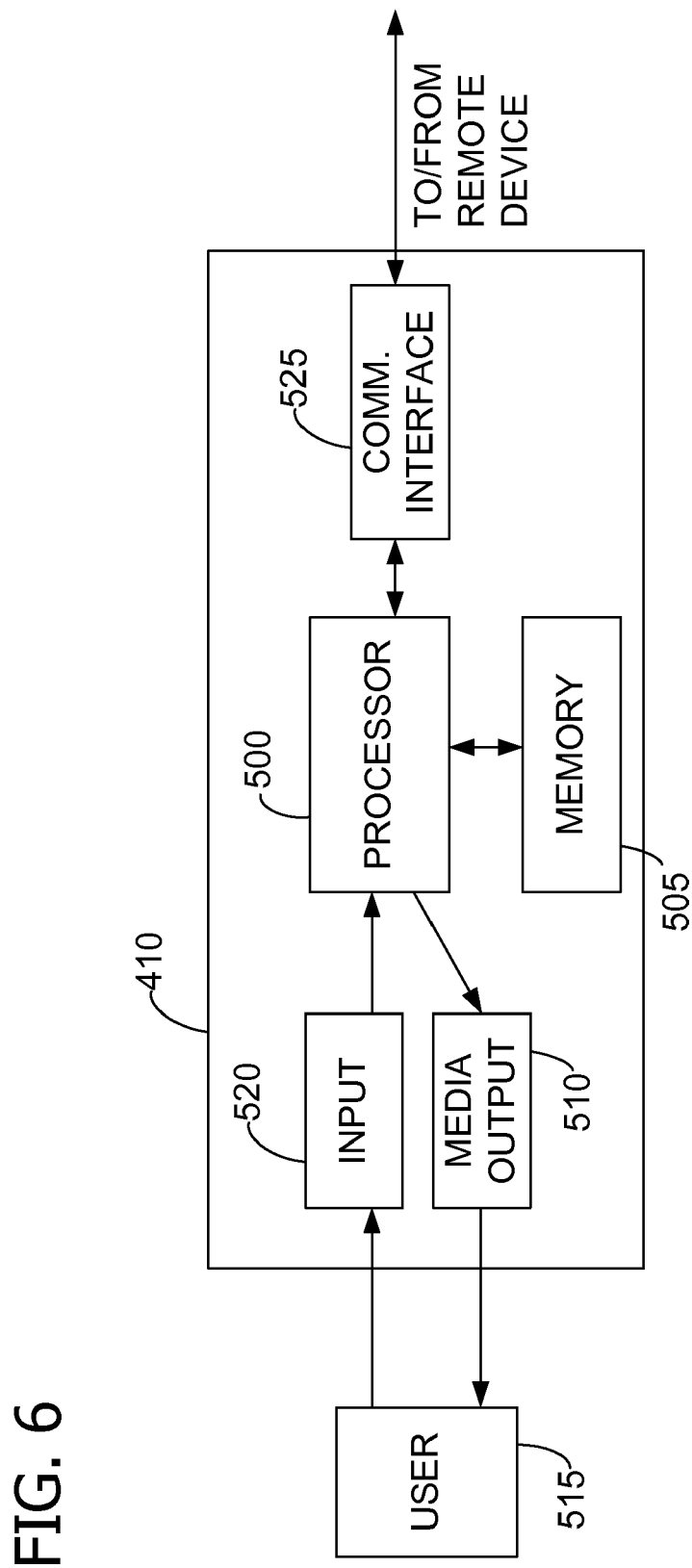
FIG. 6 is a block diagram illustrating an exemplary user computing device for use with the system shown in FIG. 5.
Figure 7:
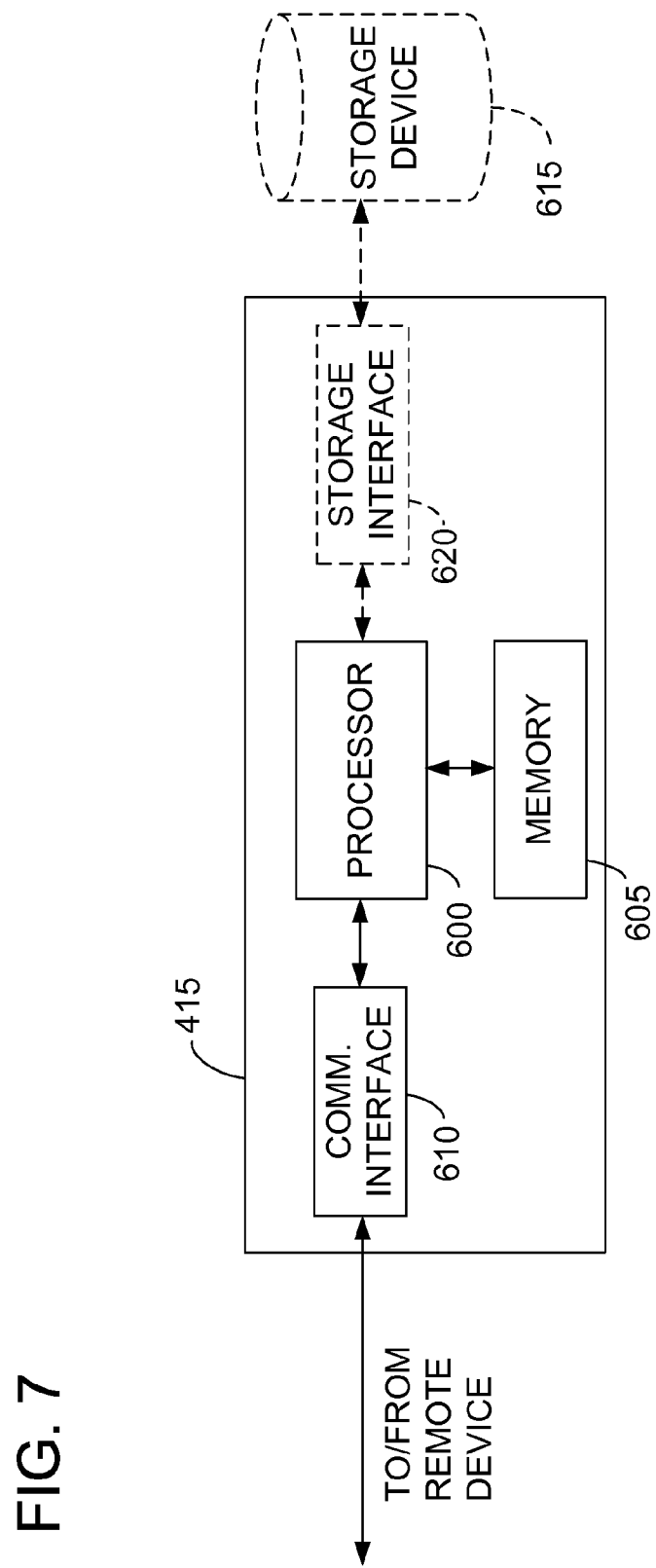
FIG. 7 is a block diagram illustrating an exemplary server computing device for use with the system shown in FIG. 5.
Figure 8:
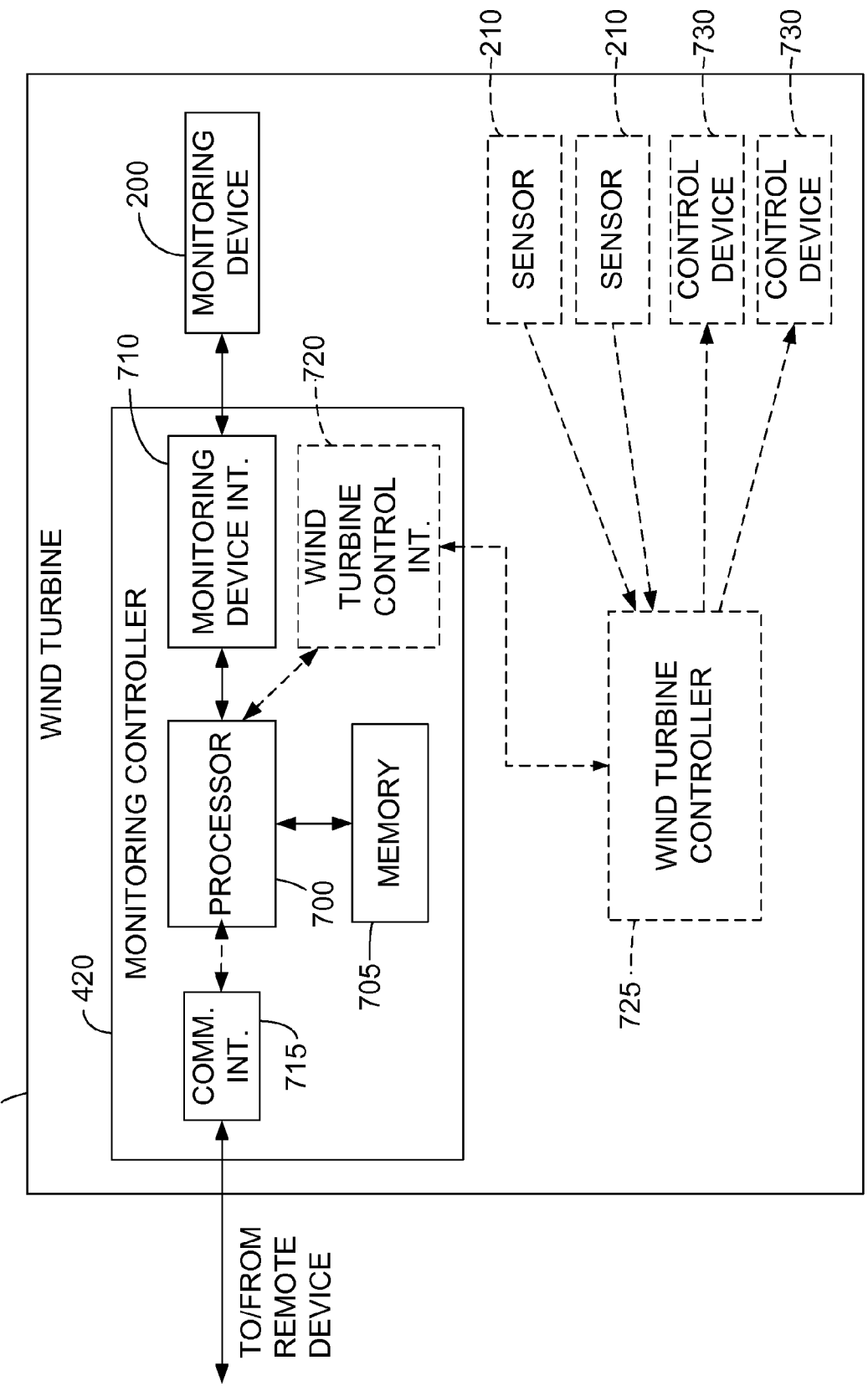
FIG. 8 is a block diagram illustrating an exemplary monitoring controller for use with the system shown in FIG. 5.

Each of user computing device 410, server computing device 415, and wind turbine monitoring controller 420 includes a processor, as shown in FIGS. 6-8. A processor may include, without limitation, an integrated circuit (IC), an application specific integrated circuit (ASIC), a microcomputer, a programmable logic controller (PLC), and/or any other programmable circuit. Each of user computing device 410, server computing device 415, and wind turbine monitoring controller 420 is configurable to perform the operations described herein by programming the corresponding processor. For example, a processor may be programmed by encoding an operation as one or more executable instructions and providing the executable instructions to the processor in a memory area (also shown in FIGS. 6-8) coupled to the processor. A memory area may include, without limitation, one or more random access memory (RAM) devices, one or more storage devices, and/or one or more computer readable media.

FIG. 6 is a block diagram illustrating an exemplary user computing device 410 for use with system 400. User computing device 410 includes a processor 500 for executing instructions. In some embodiments, executable instructions are stored in a memory area 505. Processor 500 may include one or more processing units (e.g., in a multi-core configuration). Memory area 505 is any device allowing information, such as executable instructions and/or other data, to be stored and retrieved.

User computing device 410 also includes at least one media output component 510 for presenting information to user 515. Media output component 510 is any component capable of conveying information to user 515. Media output component 510 may include, without limitation, a display device (e.g., a liquid crystal display (LCD), organic light emitting diode (OLED) display, or "electronic ink" display) or an audio output device (e.g., a speaker or headphones). In some embodiments, media output component 510 includes an output adapter, such as a video adapter and/or an audio adapter. An output adapter is operatively coupled to processor 500 and configured to be operatively coupled to an output device, such as a display device or an audio output device.

In some embodiments, user computing device 410 includes an input device 520 for receiving input from user 515. Input device 520 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of media output component 510 and input device 520. User computing device 410 also includes a communication interface 525, which is configured to be communicatively coupled to network 405, server computing device 415, and/or monitoring controllers 420.

Stored in memory area 505 are, for example, computer readable instructions for providing a user interface to user 515 via media output component 510 and, optionally, receiving and processing input from input device 520. A user interface may include, among other possibilities, a web browser and/or a client application. Web browsers and client applications enable users, such as user 515, to display and interact with media and other information from a remote device, such as server computing device 415.

FIG. 7 is a block diagram illustrating an exemplary server computing device for use with system 400. Server computing device 415 includes a processor 600 for executing instructions. Instructions may be stored in a memory area 605, for example. Processor 600 may include one or more processing units (e.g., in a multi-core configuration).

Processor 600 is operatively coupled to a communication interface 610 such that server computing device 415 is capable of communicating with a remote device, such as user computing device 410, monitoring controller 420, and/or another server computing device 415. Processor 600 may also be operatively coupled to a storage device 615. Storage device 615 is any computer-operated hardware suitable for storing and/or retrieving data. In some embodiments, storage device 615 is integrated in server computing device 415. For example, server computing device 415 may include one or more hard disk drives as storage device 615. In other embodiments, storage device 615 is external to server computing device 415 and may be accessed by a plurality of server computing devices 415. For example, storage device 615 may include multiple storage units, such as hard disks or solid state disks, in a redundant array of inexpensive disks (RAID) configuration. Storage device 615 may include a storage area network (SAN) and/or a network attached storage (NAS) system.

In some embodiments, processor 600 is operatively coupled to storage device 615 via a storage interface 620. Storage interface 620 is any component capable of providing processor 600 with access to storage device 615. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 600 with access to storage device 615.

FIG. 8 is a block diagram illustrating an exemplary monitoring controller 420 for use with system 400. Monitoring controller 420 includes a processor 700 for executing instructions. For example, instructions may be stored in a memory area 705 to program processor 700. Processor 700 may include one or more processing units (e.g., in a multi-core configuration). Processor 700 is coupled to memory area 705 and a monitoring device interface 710.

Monitoring device interface 710 is configured to be communicatively coupled to monitoring device 200. Monitoring device 200 is coupled to wind turbine 100 and configured to provide one or more monitoring signals, which include one or more audio signals and/or one or more image signals. Monitoring device interface 710 is configured to receive the monitoring signals from monitoring device 200. Monitoring device interface 710 may also be configured to control monitoring device 200. For example, monitoring device interface 710 may be configured to control an orientation, a direction, a position, a translation, a zoom level, a focus, a gain level, and/or a signal transmission of monitoring device 200.

Memory area 705 is configured to store baseline data for one or more wind turbines. In one embodiment, memory area 705 is configured to store baseline data calculated from a first monitoring signal received by monitoring device interface 710 at a first time. For example, processor 700 may calculate baseline data based on a first monitoring signal received during a period of normal operation of wind turbine 100. In an alternative embodiment, memory area 705 is configured to store predefined baseline data for one or more wind turbines. For example, baseline data may be defined for a model number of wind turbine 100, a model number of rotor blades 108, and/or a wind farm. Such an embodiment facilitates producing one set of baseline data for a plurality of wind turbines 100.

Processor 700 is programmed to calculate operating data based on a second monitoring signal received by monitoring device interface 710 at a second time. Processor 700 is also programmed to compare the operating data to the baseline data to determine an operating condition of wind turbine 100. For example, processor 700 may determine an operating condition by calculating a deviation between the operating data and the baseline data. A relatively small deviation may indicate a normal operating condition, and a large deviation may indicate an anomalous operating condition.

In some embodiments, monitoring controller 420 also includes a communication interface 715 configured to transmit the operating condition of wind turbine 100 to a remote device, such as user computing device 410 and/or server computing device 415. The operating condition may include, without limitation, an identifier of wind turbine 100, a condition descriptor (e.g., "normal" or "deviation detected"), a time at which the operating condition was determined, and/or a monitoring signal used to determine the operating condition.

In some embodiments, processor 700 compares the operating data to the baseline data to determine a deviation. In one embodiment, processor 700 is programmed to calculate baseline data and operating data by executing a fast Fourier transform (FFT) algorithm against one or more monitoring signals to produce a baseline transform and an operating transform. Processor 700 is programmed to compare the operating transform to the baseline transform to determine a deviation.

In some embodiments, monitoring device 200 provides a plurality of image signals. Processor 700 is programmed to calculate baseline data and operating data by, for example, converting an image signal from one format to a second format, indexing elements within an image signal, and/or resizing an image from an image signal. In one embodiment, baseline data includes a baseline image, and operating data includes an operating image. Processor 700 is programmed to compare operating data to baseline data by identifying differences between an operating image and a baseline image. For example, differences between the images may indicate a deviation in a shape of rotor blade 108.

Communication interface 715 may be configured to transmit a deviation notification to a remote device if the deviation determined by processor 700 exceeds a threshold. A deviation notification may include, without limitation, an identifier of wind turbine 100, a deviation quantity and/or severity, a deviation type (e.g., an amplitude deviation and/or a frequency deviation), and/or the monitoring signal from which the operating data were calculated.

In one embodiment, monitoring device 200 is configured to provide a plurality of audio signals. Processor 700 is programmed to determine a deviation by determining a frequency deviation between the operating data and the baseline data and/or an amplitude deviation between the operating data and the baseline data.

Monitoring device 200 may include one or more microphones 315. Monitoring device 200 may transmit an audio signal from each microphone or combine input from all microphones into a single audio signal. In one embodiment, monitoring device 200, monitoring device interface 710, and/or processor 700 is configured to compute a coherence based on a plurality of audio signals from a plurality of microphones, and processor 700 is configured to calculate baseline data and/or operating data based on the calculated coherence.

In one embodiment, monitoring device interface 710 is further configured to receive a plurality of audio signals and a plurality of image signals. Memory area 705 is further configured to store baseline data calculated from a first audio signal and a first image signal, and processor 700 is further configured to calculate operating data based on a second audio signal and a second image signal.

In some embodiments, monitoring controller 420 also includes a wind turbine control interface 720, which is configured to be communicatively coupled to a wind turbine controller 725. Wind turbine controller 725 may be communicatively coupled to one or more sensors 210 and one or more control devices 730 of wind turbine 100. Sensors 210, such as anemometers, are described above. Monitoring controller 420 may interact with control devices 730 and/or sensors 210 via wind turbine control interface 720 and wind turbine controller 725.

Control devices 730 are configured to control an operation of wind turbine 100 and may include, without limitation, a brake, a relay, a motor, and/or a servomechanism. In one embodiment, wind turbine controller interface 720 is configured to operate a control device 730, such as a brake and/or a motor, to prevent hub 110 (shown in FIG. 1) from rotating and/or to position one or more rotor blades 108 in a desired and/or predetermined position relative to monitoring device 200. In addition, or in the alternative, wind turbine controller interface 720 may operate a control device 730, such as a blade pitch servomechanism, to adjust one or more rotor blades 108 to a desired and/or predetermined pitch.

In some embodiments, memory area 705 is further configured to store a rotor blade orientation, such as a position and/or a pitch of one or more rotor blades 108 corresponding to the baseline data. Wind turbine control interface 720 may be configured to orient each rotor blade 108 of wind turbine 100 based on the stored rotor blade orientation before processor 700 calculates the operating data. In one embodiment, wind turbine control interface 720 is configured to orient rotor blade 108 in a stationary position, and monitoring device interface 710 is further configured to receive a monitoring signal by receiving one or more images of rotor blade 108.

Monitoring controller 420 may interact with a remote device, such as user computing device 410 or server computing device 415 (shown in FIGS. 5-7). In some embodiments, user computing device 410 is communicatively coupled to monitoring controller 420 (e.g., via network 405) and receives an operating condition and/or a deviation notification from monitoring controller 420. User computing device 410 includes, as media output component 510, a display device configured to display the operating condition and/or deviation notification. Memory area 705 may be configured to store monitoring signals. For example, processor 700 may maintain a rolling log (e.g., from the previous twenty-four hours) of monitoring signals in memory area 705. In addition, or in the alternative, server computing device 415 may be configured to request monitoring signals from one or more monitoring controllers 420, and server computing device 415 may be configured to store monitoring signals from the one or more monitoring controllers 420 in memory area 605 and/or storage device 615.

In one embodiment, communication interface 715 is configured to transmit one or more monitoring signals to a remote device. For example, communication interface 715 may stream a monitoring signal to server computing device 415 and/or user computing device 410 substantially as the monitoring signal is received by monitoring device interface 710. Such an embodiment facilitates real-time or near-real-time remote monitoring of wind turbine 100.

In some embodiments, server computing device 415 is communicatively coupled to a plurality of wind turbines 100 via network 405, and one or more user computing devices 410 are communicatively coupled to server computing device 415. Server computing device 415 receives operating conditions and/or deviation notifications from the wind turbines 100. User computing device 410 accesses operating conditions and/or deviation notifications from server computing device 415. In addition, or in the alternative, server computing device 415 receives a deviation notification from monitoring controller 420 and transmits the deviation notification to a plurality of user computing devices 410.

In one embodiment, user computing device 410 includes, as media output component 510, a display device configured to display a history of deviation notifications for wind turbine 100. For example, server computing device 415 may store deviation notifications in memory area 605 or storage device 615, and user computing device 410 may request deviation notifications associated with a particular wind turbine 100. In addition, or in the alternative, the display device may be configured to display a history of deviation notifications for one or more other wind turbines 100 proximate to wind turbine 100. For example, the display device may display a history of deviation notifications for a plurality of wind turbines 100 within a wind farm. Such an embodiment facilitates identifying, within a geographic area, a plurality of wind turbines 100 exhibiting potential impending issues.

Figure 9:
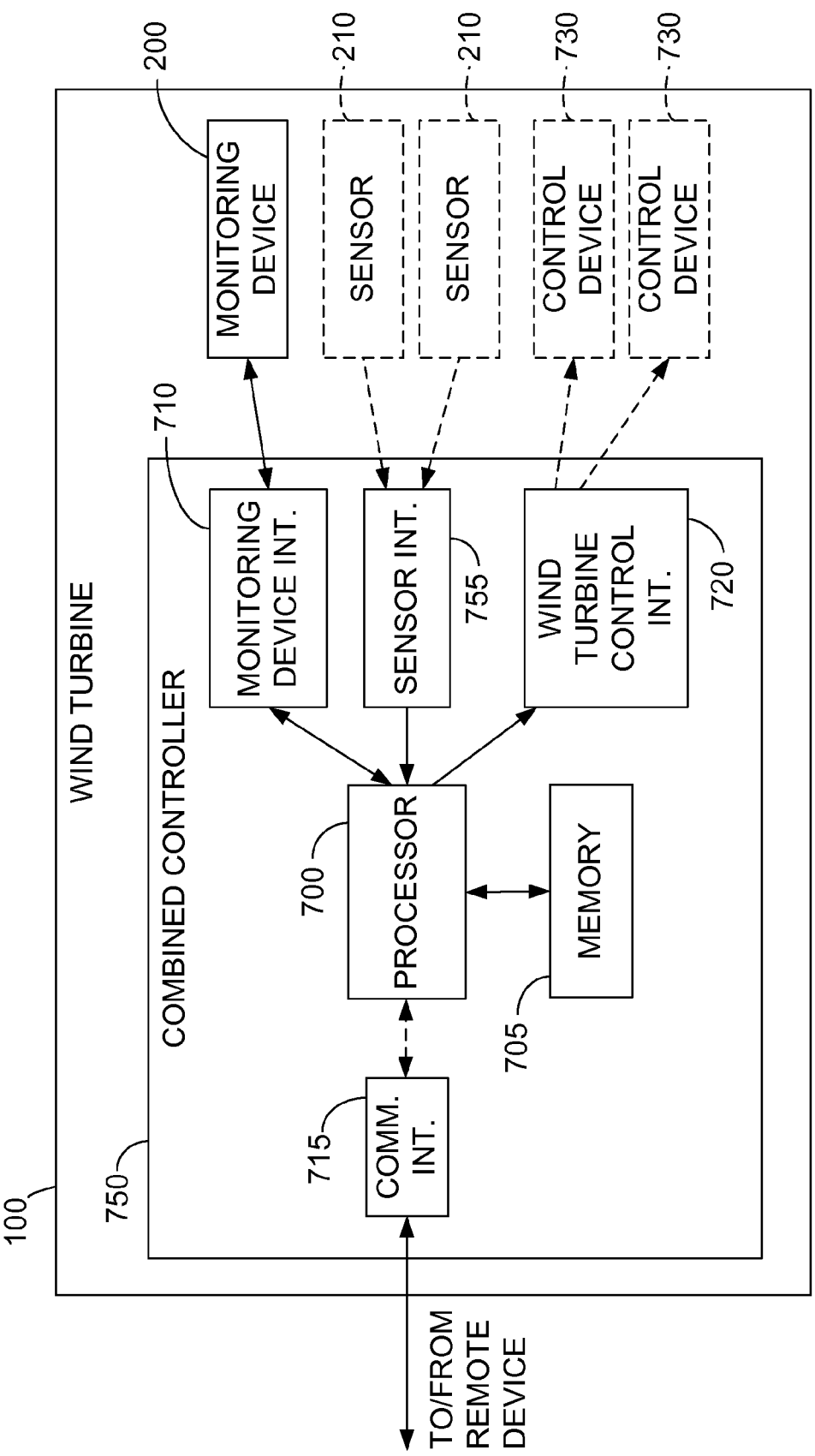
FIG. 9 is a block diagram illustrating an exemplary combined controller for use with the system shown in FIG. 5.

FIG. 9 is a block diagram illustrating an exemplary combined controller 750 for use with system 400. In the exemplary embodiment, monitoring controller 420 (shown in FIGS. 5 and 8) is implemented as combined controller 750. Combined controller 750 also performs at least some of the functions performed by wind turbine controller 725 (shown in FIG. 8).

Combined controller 750 includes processor 700, memory area 705, monitoring device interface 710, and communication interface 715, as described above with regard to FIG. 8. Combined controller 750 also includes wind turbine control interface 720, which, in the exemplary embodiment, interacts directly with one or more control devices 730. Combined controller 750 also includes a sensor interface 755, which is configured to be communicatively coupled to one or more sensors 210.

Monitoring controller 420, wind turbine controller 725, and/or combined controller 750 may be communicatively coupled to monitoring device 200, sensors 210 and/or control devices 730 via an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394, a parallel data connection, such as IEEE 1284 or IEEE 488, a short-range wireless communication channel such as BLUETOOTH, a private (e.g., inaccessible outside wind turbine 100) network connection, whether wired or wireless, and/or any other connection type suitable for carrying communication and/or data signals. BLUETOOTH is a registered trademark of Bluetooth SIG, Inc., of Bellevue, Wash.

Figure 10:
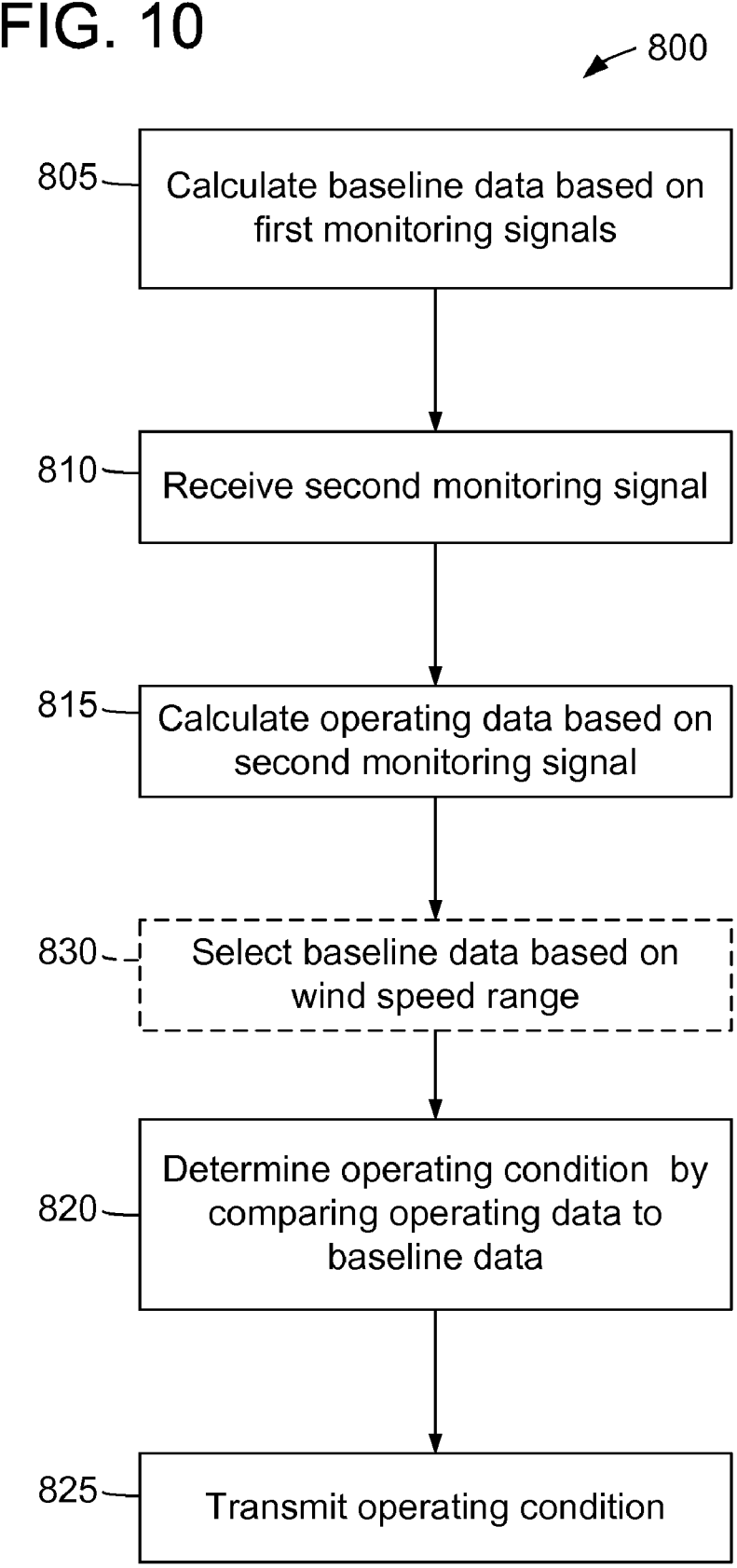

FIGS. 10 and 11 are a flowchart of an exemplary method 800 for monitoring a wind turbine having a monitoring device configured to provide a plurality of monitoring signals. The monitoring signals include a plurality of audio signals and/or a plurality of image signals. The method includes calculating 805, by a computing device, baseline data based on one or more first monitoring signals.

A second monitoring signal is received 810 from the monitoring device. Operating data are calculated 815 by the computing device based on the second monitoring signal. An operating condition of the wind turbine is determined 820 by comparing the operating data to the baseline data, and the operating condition, optionally including the second monitoring signal, is transmitted 825 to a remote device.

In one embodiment, determining 820 an operating condition includes determining a deviation source. A deviation source may include, without limitation, a rotor blade, a drive train, and/or an environmental element. A deviation source may be determined based on a character of a deviation between the operating data and the baseline data. For example, a periodically repeating amplitude deviation in a particular frequency range may indicate that a rotor blade is producing a whistling sound, which may indicate structural damage to the rotor blade. As other examples, gear wear or strain may produce a relatively constant amplitude and/or frequency deviation, and oceanic waves may produce relatively random deviations or deviations within particular frequencies. A change in blade geometry (e.g., due to warping or icing) may also produce a recognizable deviation.

In some embodiments, operating data are calculated 815 based on a plurality of audio signals. For example, multiple audio signals may be combined by adding the audio signals and/or calculating a moving average from the audio signals.

Referring to FIG. 11, in some embodiments, baseline data are calculated 805 by receiving 850 a plurality of audio signals. In one particular embodiment, each audio signal corresponds to a wind speed signal received from a wind speed sensor. Each received audio signal is associated 855 with a wind speed range based on the corresponding wind speed signal. For example, five wind speed ranges (e.g., 0-5 meters/second (m/s), 5-10 m/s, 10-15 m/s, 15-20 m/s, and 20-25 m/s) may be defined for a wind turbine. Baseline data are calculated 860 for each wind speed range. In one embodiment, receiving 810 a second monitoring signal from the monitoring device includes receiving an audio signal corresponding to a wind speed signal received from the wind speed sensor.

In such embodiments, method 800 also includes selecting 830 the baseline data based on a wind speed range corresponding to the wind speed signal. For example, if the audio signal corresponds to a wind speed signal indicating a wind speed of 7 m/s, baseline data for the wind speed range of 5-10 m/s is selected 830. The operating data are compared to the selected baseline data. Such embodiments facilitate classifying audio signals by wind speed. In addition, or in the alternative, audio signals may be classified by rotational speed of hub 110, power output of wind turbine 100, or any other suitable parameter.

In one embodiment, an operating condition is determined 820 based on three-dimensional images of one or more rotor blades. The first and second monitoring signals include a plurality of two-dimensional images. For example, a plurality of images, each corresponding to a different perspective of a rotor blade, may be provided by a monitoring device. Calculating 805 baseline data includes generating a first three-dimensional image of one or more rotor blades based on a first plurality of two-dimensional images from the first monitoring signal, and calculating 815 operating data includes generating a second three-dimensional image of the one or more rotor blades based on a second plurality of two-dimensional images from the second monitoring signal.

The methods described herein may be encoded as executable instructions embodied in a computer readable medium, including, without limitation, a memory area of a computing device. Such instructions, when executed by a processor, cause the processor to perform at least a portion of the methods described herein.

Exemplary embodiments of a wind turbine control system are described above in detail. The monitoring system, wind turbine, and included assemblies are not limited to the specific embodiments described herein, but rather each component may be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for monitoring a wind turbine, the system comprising:
   a monitoring device coupled to the wind turbine and configured to provide one or more monitoring signals including at least one of an audio signal and an image signal; and,
   a monitoring controller communicatively coupled to the monitoring device and configured to:
      provide baseline data representative of normal operation of the wind turbine;
      create operating data based on a monitoring signal received from the monitoring device;
      compare the operating data to the baseline data to determine a deviation; and,
      transmit a deviation notification when the deviation exceeds a threshold.

2. A system in accordance with claim 1, wherein the operating data are based on a first monitoring signal received from the monitoring device, and the monitoring controller is further configured to create the baseline data based on a second monitoring signal received from the monitoring device.

3. A system in accordance with claim 1, wherein the monitoring device is configured to provide a plurality of audio signals, and the monitoring controller is further configured to determine a deviation by determining at least one of a frequency deviation between the operating data and the baseline data and an amplitude deviation between the operating data and the baseline data.

4. A system in accordance with claim 1, further comprising a remote device communicatively coupled to the monitoring controller, the remote device comprising a display device configured to display the deviation notification.

5. A system in accordance with claim 1, wherein the wind turbine is a first wind turbine, the system further comprising a remote device communicatively coupled to the monitoring controller and comprising a display device configured to display at least one of a history of deviations for the first wind turbine and a deviation for a second wind turbine proximate to the first wind turbine.

6. A system in accordance with claim 1, wherein the monitoring device comprises a directional monitoring device configured to monitor at least one rotor blade of the wind turbine.

7. A system in accordance with claim 6, further comprising a translation mechanism coupled to the wind turbine, wherein the directional monitoring device is coupled to the translation mechanism.

8. A system in accordance with claim 7, wherein the rotor blade is coupled to a hub rotatable about a rotational axis, and the translation mechanism defines a translation axis substantially parallel to the rotational axis.

9. A system in accordance with claim 7, wherein the directional monitoring device is further configured to provide a monitoring signal by providing a plurality of images, each image of the plurality of images corresponding to one of a plurality of positions along the translation axis.

10. A device for monitoring an operating condition of a wind turbine, the device comprising:
   a monitoring device interface configured to receive one or more monitoring signals from a wind turbine monitoring device, the monitoring signal including at least one of an audio signal and an image signal;
   a memory area configured to store baseline data calculated from at least a first monitoring signal received by the monitoring device interface at a first time; and,
   a processor coupled to the monitoring device interface and the memory area, the processor programmed to:
      calculate operating data based on a second monitoring signal received by the monitoring device interface at a second time; and,
      compare the operating data to the baseline data to determine an operating condition of the wind turbine; and,
   a communication interface configured to transmit the operating condition of the wind turbine to a remote device.

11. A device in accordance with claim 10, wherein:
   the memory area is further configured to store baseline data by storing baseline data calculated from a first audio signal and a first image signal; and,
   the processor is further configured to calculate operating data by calculating operating data based on a second audio signal and a second image signal.

12. A device in accordance with claim 10, wherein the memory area is further configured to store a rotor blade orientation corresponding to the baseline data.

13. A device in accordance with claim 12, further comprising a wind turbine control interface configured to orient a rotor blade of the wind turbine based on the stored rotor blade orientation before the processor calculates the operating data.

14. A device in accordance with claim 13, wherein the wind turbine control interface is further configured to orient the rotor blade in a stationary position, and the monitoring device interface is further configured to receive a monitoring signal by receiving one or more images of the rotor blade.

15. A method for monitoring a wind turbine having a monitoring device configured to provide one or more monitoring signals comprising an audio signal or an image signal, the method comprising:
   calculating, by a computing device, baseline data based on at least one first monitoring signal;
   receiving, from the monitoring device, a second monitoring signal;
   calculating, by the computing device, operating data based on the second monitoring signal;
   determining an operating condition of the wind turbine by comparing the operating data to the baseline data; and,
   transmitting the operating condition to a remote device.

16. A method in accordance with claim 15, wherein determining an operating condition of the wind turbine comprises determining a deviation source comprising at least one of the following: a rotor blade, a drive train, and an environmental element.

17. A method in accordance with claim 15, wherein transmitting the operating condition to a remote device comprises transmitting the second monitoring signal to the remote device.

18. A method in accordance with claim 15, wherein:
   calculating, by a computing device, baseline data based on at least one first monitoring signal comprises generating a first three-dimensional image of a rotor blade based on a first plurality of two-dimensional images from the monitoring signal; and,
   calculating, by the computing device, operating data based on the second monitoring signal comprises generating a second three-dimensional image of the rotor blade based on a second plurality of two-dimensional images from the second monitoring signal.

19. A method in accordance with claim 15, wherein calculating, by a computing device, baseline data based on at least one first monitoring signal comprises:
   receiving an audio signal corresponding to a wind speed signal received from a wind speed sensor;
   associating the audio signal with a wind speed range based on the corresponding wind speed signal; and,
   calculating baseline data for the wind speed range.

20. A method in accordance with claim 19, wherein receiving, from the monitoring device, a second monitoring signal comprises receiving an audio signal corresponding to a wind speed signal received from the wind speed sensor, the method further comprising selecting the baseline data based on a wind speed range corresponding to the wind speed signal.

* * * * *